(12) United States Patent
Ueno

(10) Patent No.: US 7,284,435 B2
(45) Date of Patent: Oct. 23, 2007

(54) PRESSURE SENSOR

(75) Inventor: Masato Ueno, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/194,648

(22) Filed: Aug. 2, 2005

(65) Prior Publication Data
US 2006/0027025 A1 Feb. 9, 2006

(30) Foreign Application Priority Data
Aug. 6, 2004 (JP) ............... 2004-230866

(51) Int. Cl.
G01L 7/00 (2006.01)
(52) U.S. Cl. .................... 73/706; 73/756
(58) Field of Classification Search ............ 73/756, 73/715, 706, 723, 725
See application file for complete search history.

(56) References Cited
U.S. PATENT DOCUMENTS
5,900,554 A * 5/1999 Baba et al. ............ 73/725

6,651,508 B2 11/2003 Baba et al.
7,036,380 B2 * 5/2006 Fessele et al. ............ 73/706
2005/0247133 A1 * 11/2005 Fessele et al. ............ 73/753

FOREIGN PATENT DOCUMENTS
JP A-10-267778 10/1998

* cited by examiner

Primary Examiner—Andre J. Allen
(74) Attorney, Agent, or Firm—Posz Law Group, PLC

(57) ABSTRACT

A pressure sensor for detecting a pressure of a pressure medium includes a casing having an element locating portion, a pressure detection element located in the element locating portion of the casing, and a gel member filled in the element locating portion to seal the pressure detection element. In the pressure sensor, the gel member is exposed from an opening portion of the element locating portion in the casing such that the pressure of the pressure medium is applied to the pressure detection element through the gel material, and the gel member protrudes from a surface of a circumference portion of the opening portion in the casing. Accordingly, it can prevent water from staying on the gel member.

14 Claims, 3 Drawing Sheets

PRESSURE SENSOR

CROSS REFERENCE TO RELATED APPLICATION

This application is based on Japanese Patent Application No. 2004-230866 filed on Aug. 6, 2004, the contents of which are incorporated herein by reference in its entirety.

FIELD OF THE INVENTION

The present invention relates to a pressure sensor in which a pressure detection element located in a casing is sealed by a gel member.

BACKGROUND OF THE INVENTION

In a pressure sensor described in U.S. Pat. No. 6,651,508 (corresponding to JP-A-2002-221462), a pressure detection element is located in a casing, and the casing is filled with a gel material so as to seal the pressure detection element. The gel material is exposed from an opening portion of the casing so that the pressure of a pressure medium is applied to the pressure detection element through the gel material.

In this pressure sensor, because the pressure detection element is sealed by the gel material, the pressure detection element can be protected from moisture or foreign material contained in the pressure medium. However, when the pressure sensor is used in an exhaust gas environment having a high humidity or a high acidity, for example, the moisture contained in the pressure medium adheres on the casing and the gel material exposed from the opening portion of the casing, and stays thereon as condensed water. In this case, if the condensed water is frozen, an extra force is applied to the gel material, and the pressure transmission of the gel material is deteriorated. Furthermore, when water having a high corrosion property stays on the gel material, the gel material is deteriorated, and the pressure sensor cannot accurately detect the pressure of the pressure medium.

SUMMARY OF THE INVENTION

In view of the above-described problems, it is an object of the present invention to effectively restrict water from staying on a gel member, in a pressure sensor in which a pressure detection element located in a casing is sealed by the gel member.

According to the present invention, a pressure sensor for detecting a pressure of a pressure medium includes a casing having an element locating portion, a pressure detection element located in the element locating portion of the casing, and a gel member filled in the element locating portion to seal the pressure detection element. Furthermore, the gel member is exposed from an opening portion of the element locating portion in the casing and is provided such that the pressure of the pressure medium is applied to the pressure detection element through the gel member. In addition, the gel member protrudes from a surface of a circumference portion of the opening portion in the casing. Accordingly, water condensed on the surface of the circumference portion around the gel member in the casing flows on this surface while avoiding the gel member. Therefore, it can effectively restrict water from staying on the gel member.

When a protrusion portion protrudes from the surface of the circumference portion of the opening portion to surround the gel member, the protrusion portion prevents the water from contacting the gel member. For example, a part of the casing protrudes from the surface of the circumference portion to form the protrusion portion.

Furthermore, water-staying prevention means can be provided for preventing water from staying on the surface of the circumference portion around the opening portion in the casing. For example, the circumference portion has grooves recessed from the surface of the circumference portion as the water-staying preventing means. Alternatively, a plurality of protrusions protruding from the surface of the circumference portion can be formed as the water-staying preventing means. Here, the shapes of the grooves or the protrusions can be suitably changed.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS

First Embodiment

Figure 1A:
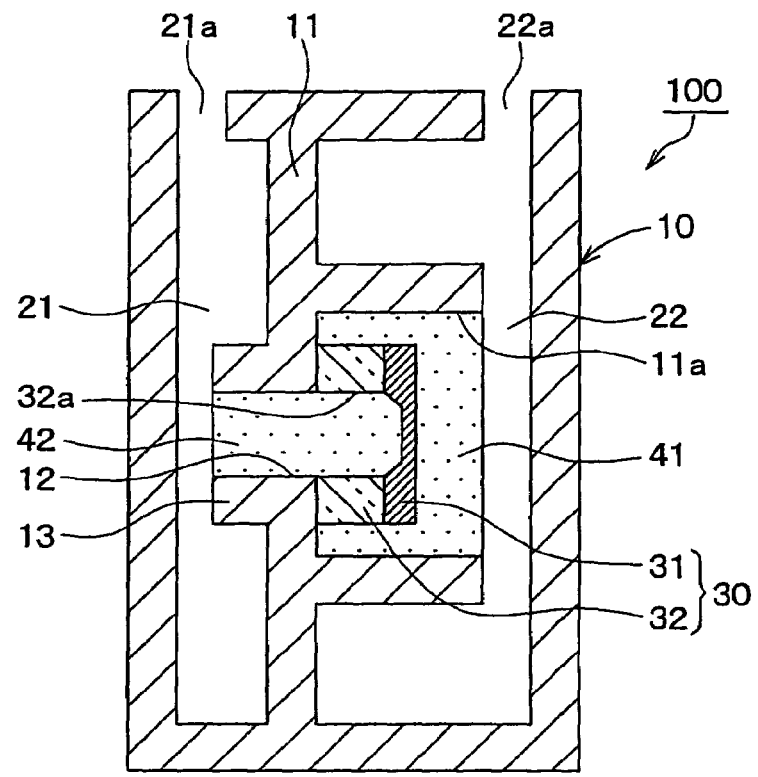
FIG. 1A is a schematic cross-sectional view of a pressure sensor according to a first preferred embodiment of the present invention.

In the first embodiment, as shown in FIG. 1A, a pressure sensor 100 includes a casing 10 which forms a pressure sensing body. The casing 10 can be made of a resin material or can be made of a ceramic or metal material. For example, as the resin material, polybutylene terephthalate (PBT) or polyphenylene sulfide (PPS) can be used.

The casing 10 includes an element locating portion 11 in which a pressure detection element 30 is located, and first and second pressure introducing passages 21, 22 provided around the element locating portion 11.

The first pressure introducing passage 21 and the second pressure introducing passage 22 are partitioned from each other in the casing 10. The first pressure introducing passage 21 has a first pressure introducing port 21a from which a pressure medium is introduced therein, and the second pressure introducing passage 22 has a second pressure introducing port 22a from which a pressure medium is introduced therein.

For example, the first pressure introducing port 21a is connected to an upstream side of a diesel particle filter (DPF) of an exhaust pipe, and the second pressure introducing port 22a is connected to a downstream side of the DPF of the exhaust pipe, by using rubber hoses, for example. In this case, exhaust gas is filtered by a filter material of the DPF. Therefore, a pressure medium having relatively high corrosion property is introduced into the first pressure introducing passage 21, and a pressure medium having relatively low corrosion property is introduced into the second pressure introducing passage 22.

The element locating portion 11 provided in the casing 10 has an element locating chamber 11a in which the pressure detection element 30 is accommodated. The pressure detection element 30 generates an electrical signal in accordance with a pressure applied thereto.

As an example, the pressure detection element 30 can be constructed with a sensor chip 31 formed from a semiconductor substrate, and a glass pedestal 32 disposed at a back surface of the sensor chip 30 to hold the sensor chip 31. Here, the semiconductor substrate can be formed from a silicon semiconductor, and the sensor chip 31 and the glass pedestal 32 can be integrated using anode bonding, for example. However, a structure of the pressure sensor 100 different from the above structure can be used.

For example, the sensor chip 31 can be formed from a general structure using a piezoelectric resistance. In the example shown in FIG. 1A, the sensor chip 31 has a diaphragm and a diffused resistor. The sensor chip 31 having the diaphragm and the diffused resistor is arranged at the right side in FIG. 1A to receive the pressure of the pressure medium from the second pressure introducing passage 22.

The sensor chip 31 is located in the element locating chamber 11a of the casing 10, and is fixed to the element locating portion 11 through the glass pedestal 32. For example, the glass pedestal 32 is bonded to the element locating portion 11 using an adhesive such as silicon rubber.

Furthermore, an electrical connection structure of the pressure detecting element 30 can be formed similarly to the electrical connection structure in U.S. Pat. No. 6,651,508.

As an example, the pressure sensor 30 can be electrically connected to an exterior through terminals and wires. In this case, terminals made of an electrical conductor material (e.g., Cu) can be integrally formed with the casing 10 by insert-molding. The terminals are generally insert-molded in the element locating portion 11, and are exposed into the element locating chamber 11a. The exposed portion of the terminals is electrically connected to the sensor chip 31 in the pressure sensor 30, by using bonding wires made of gold or aluminum, for example. In contrast, the other ends of the terminals are disposed to be connectable to an outer circuit of the casing 10.

A through hole 32a is formed in the glass pedestal 32 on the back surface of the sensor chip 31. Further, an opening portion 12 is formed in the element locating portion 11 in the casing 10, at a position corresponding to the through hole 32a of the pedestal 32. Therefore, the opening portion 12 is a through hole continuously formed from the through hole 32a of the glass pedestal 32.

Figure 1B:
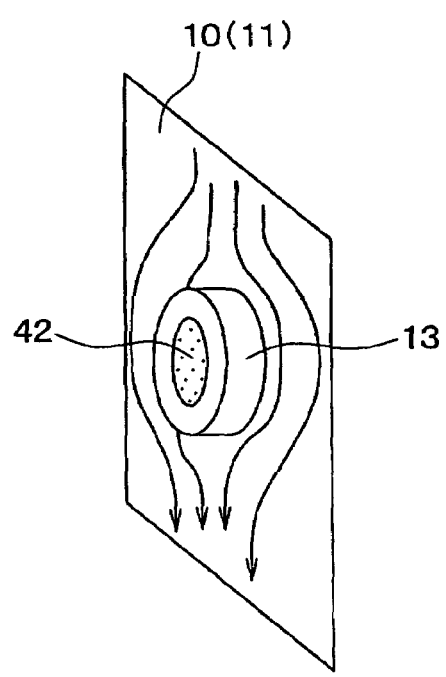
FIG. 1B is a schematic perspective view showing the vicinities of an opening portion and a protrusion portion of a casing in the pressure sensor of FIG. 1A.

A protrusion portion (bank portion) 13 is formed to protrude from a surface of a circumference portion of the opening portion 12 into the first pressure introducing passage 21 in the element locating portion 11. In this embodiment, a part of the casing 10 is protruded to form the protrude portion 13, and the protrusion portion 13 is formed into a cylindrical shape as shown in FIG. 1B.

The pressure detection element 30 is sealed by gel members 41, 42 within the element locating portion 11 of the casing 10. The gel members 41, 42 are formed from an electrical insulation gel material which has a chemical-proof property. Furthermore, the gel members 41, 42 have a suitable elasticity so as to not apply a surplus stress to each component sealed in the gel members 41, 42. For example, as the gel material for forming the gel members 41, 42, a fluorine gel material can be used.

The first gel member 41 is filled in the element locating chamber 11a to seal the front surface of the pressure detection element 30. That is, the first gel member 41 seals the surface of the sensor chip 31. The second gel member 42 is filled in the through hole 32a of the glass pedestal 32 and the opening portion 12 inside the protrusion portion 13, so as to seal the back surface of the pressure detection element 30, that is, the back surface of the sensor chip 31.

In this embodiment, the pressure detection element 30, the terminals and the bonding wires are covered by the gel members 41, 42. Therefore, the pressure detection element 30, the terminals and the bonding wires can be protected from the exterior, can be electrically insulated, and can be prevented from being corroded.

As shown in FIGS. 1A and 1B, the second gel member 42 is exposed from the opening portion 12 to protrude from a surface of the circumference portion of the opening portion 12 in the element locating portion 11 of the casing 10. Furthermore, the protrusion portion 13 is formed on the surface of the circumference portion of the opening portion 12 in the casing 10 to surround the second gel member 42.

Next, a manufacturing method of the pressure sensor 100 will be simply described. First, a casing 10 in which terminals are insert-molded is prepared. Then, the pressure detection element 30 is fixed at a predetermined position in the casing 10 by using an adhesive, for example. After electrical connection between the pressure detection element 30 and the terminals is performed by wire bonding or the like, a gel material for forming the gel members 41, 42 are filled and are hardened through thermal setting, for example.

The pressure sensor 100 is generally mounted on a vehicle such that the vertical direction of the pressure sensor 100 in FIG. 1 is positioned vertically on the vehicle. Furthermore, a pressure medium having a relatively high corrosion property at the upstream side of the DPF is introduced into the first pressure introducing passage 21, and a pressure medium having a relatively low corrosion property at the downstream side of the DPF is introduced into the second pressure introducing passage 22, for example.

Furthermore, in the casing 10, the pressure of the pressure medium at the downstream side of the DPF is applied to the first gel member 41 so that the applied pressure is transmitted from the first gel member 41 to the surface of the pressure detection element 30, that is, to the surface of the sensor chip 31.

In contrast, the pressure of the pressure medium at the upstream side of the DPF is applied to the second gel member 42, and is transmitted to the back surface of the pressure detection element 30 through the second gel member 42. Therefore, a differential pressure between the front surface and back surface of the sensor chip 31 can be detected.

A stress of the front surface of the sensor chip 31 due to the applied pressure is converted to an electrical signal through a convert circuit, and the electrical signal from the sensor chip 31 is output to the exterior by the circuit, through the terminals.

In the first embodiment, the pressure sensor 100 includes the casing 10, the pressure detection element 30 located in the casing 10, and at least the gel member 42 filled in the casing 10 to seal the pressure detection element 30. The gel member 42 is exposed from the opening portion 42 of the casing 10, and a pressure of a pressure medium is applied to the pressure detection element 30 through the gel member 42 exposed from the opening portion 12. In the pressure sensor 100, the gel member 42 protrudes from the surface of the circumference portion of the opening portion 12 in the casing 10, and is exposed from the opening portion 12.

Because the gel member 42 protrudes from the surface of the circumference portion of the opening portion 12 in the casing 10, condensed water on the surface of the circumference portion around the gel member 42 flows to avoid the gel member 42. Accordingly, it can restrict water from staying on the gel member 42.

Furthermore, the protrusion portion (bank portion) 13 is provided on the surface of the circumference portion of the opening portion 12 in the casing 10, to surround the gel member 42 protruding from the opening portion 12. Therefore, it can prevent the water, flowing around the gel member 42 while avoiding the gel member 42, from contacting the protrusion portion 13. In this case, the condensed water can be effectively prevented from staying on the gel member 42.

Second Embodiment

The second embodiment of the present invention will be now described with reference to FIGS. 2A and 2B.

Figure 2A:
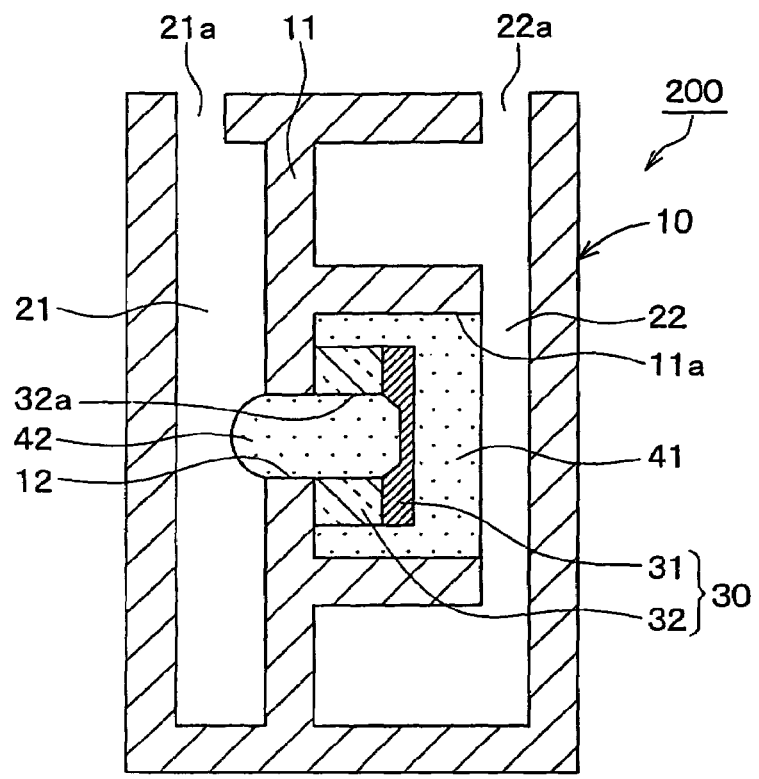
FIG. 2A is a schematic cross-sectional view of a pressure sensor according to a second preferred embodiment of the present invention.
Figure 2B:
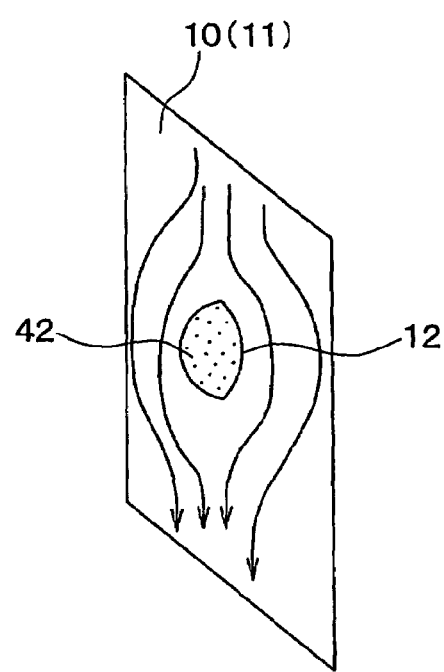
FIG. 2B is a schematic perspective view showing the vicinities of an opening portion of a casing in the pressure sensor of FIG. 2A.

In the second embodiment, as shown in FIGS. 2A and 2B, the second gel member 42 is exposed from the opening portion 12 to directly protrude from the surface of the circumference portion of the opening portion 12. That is, in the second embodiment, the protrusion portion 13 of the above-described first embodiment is not provided.

In the second embodiment, it can restrict water from staying on the gel member 42 by using a surface tension of the gel member 42. Accordingly, even when the gel member 42 protrudes from the surface of the circumference portion of the opening portion 12 in the casing 10 to be exposed from the opening portion 12, water flows around the gel member 42 while avoiding the gel member 42 as shown in FIG. 2B.

Furthermore, because the protruding end of the gel member 42 is formed to have a round surface, the condensed water does not stay on the gel member 42.

In the second embodiment, the other parts of the pressure sensor can be formed similarly to those of the above-described first embodiment.

Third Embodiment

The third embodiment of the present invention will be now described with reference to FIGS. 3A-3C.

In the third embodiment, the gel member 42 protrudes from the surface of the circumference portion of the opening portion 12 in the casing 10 to protrude from the circumference portion of the opening portion 12. Furthermore, a water-staying prevention structure 14 for preventing water from staying on the circumference portion is provided on the surface of the circumference portion of the opening portion 12 in the casing 10.

The water-staying prevention structure 14 is formed for expending the condensed water rapidly on the surface of the casing 10 using capillary phenomenon, or for expending a contact area of the water and the casing 10. For example, by increasing wetting performance of the surface of the casing 10, the contact area between the surface of the casing 10 and the water can be increased so as to quickly dry the surface of the casing 10.

Figure 3A:
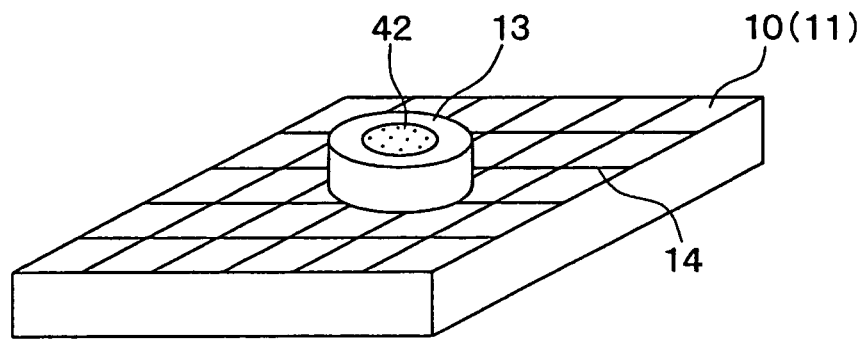
FIGS. 3A to 3C are perspective views each showing a water-staying restriction structure of a pressure sensor according to a third preferred embodiment of the present invention.

In the example shown in FIG. 3A, a grill shaped grooves are formed on the surface of the casing 10 around the opening portion 12, for forming the water-staying prevention structure 14. In this case, the condensed water can be easily expanded using the capillary phenomenon. Here, the shape of the grill shaped grooves for forming the water-staying prevention structure 14 can be changed to other shape, or can be formed in random.

Figure 3B:
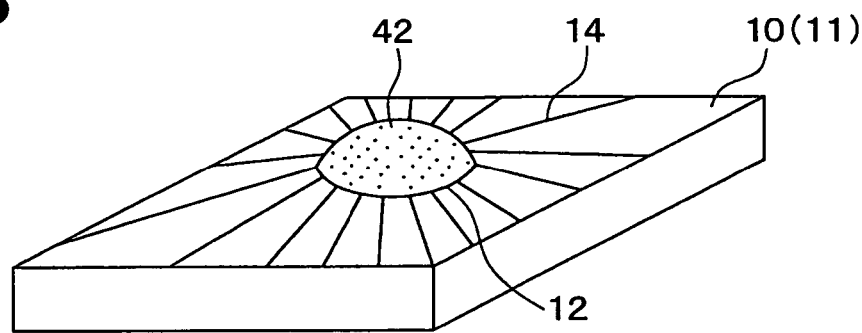

In the example shown in FIG. 3B, radially extending grooves are formed around the opening portion 12 on the surface of casing 10, for forming the water-staying prevention structure 14. In this case, water is easily expanded through the radially extending proves using the capillary phenomenon.

Figure 3C:
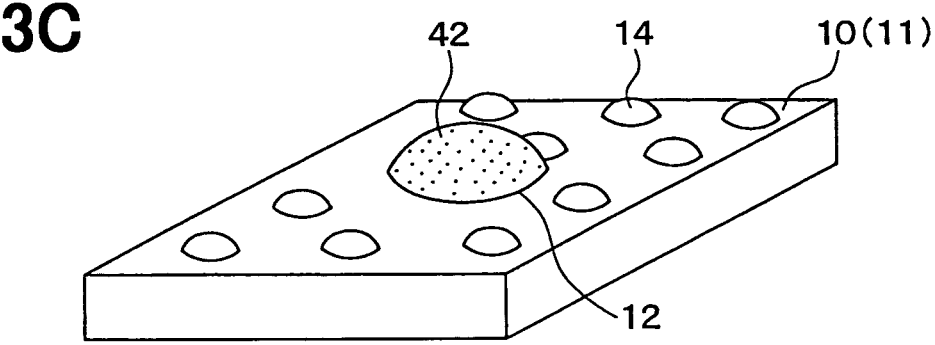

In the example shown in FIG. 3C, plural protrusions are formed on the surface of the circumference portion of the opening portion 12 in the casing 10, for forming the water-staying prevention structure 14. In this case, the surface tension of the condensed water on the surface of the casing 10 is made smaller so that the wetting of the water on the surface of the casing is increased.

In the example shown in FIG. 3A, a protrusion portion 13 for surrounding the gel member 42 can be provided similarly to the above-described first embodiment. Similarly, the protrusion portion 13 for surrounding the gel member 42 can be formed in the example shown in FIGS. 3B, 3C.

Accordingly, in the third embodiment, when the water flows on the surface of the circumference portion of the opening portion 12 while avoiding the gel member 42, the water can be easily expanded by the water-staying prevention structure 14 on the surface of the circumference portion of the opening portion 12 in the casing 10. That is, because the water is expanded from the gel member 42 by the water-staying prevention structure 14, it can effectively prevent water from staying on the surface of the casing 10 around the gel member 42.

Other Embodiments

Although the present invention has been described in connection with some preferred embodiments thereof with reference to the accompanying drawings, it is to be noted that various changes and modifications will become apparent to those skilled in the art.

For example, in the above-described embodiments, the water-staying prevention structure is used for the second gel member 42 to which the relative high corrosive pressure medium is introduced through the first pressure introduction passage 21. However, the water-staying prevention structure can be used for the first gel member 41 on the face side of the sensor chip 31 of the pressure detection element 30. That is, similarly to the structure of the second gel member 42, the first gel member 41 can protrude from the surface of an opening portion in the casing 10 to protrude from the opening portion.

The structure of the pressure detection element 30 is not limited to the semiconductor-diaphragm structure, and can be arbitrarily changed.

In the above-described embodiments, the pressure sensor is used for detecting a differential pressure. However, the pressure sensor can be used for detecting an absolute pressure using a reference pressure such as a vacuum. Furthermore, the pressure sensor can be suitably used for detecting a pressure of a pressure medium having a high humidity.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A pressure sensor for detecting a pressure of a pressure medium, comprising:
a casing having an element locating portion;
a pressure detection element located in the element locating portion of the casing, wherein the pressure detection element has therein an element hole; and
a gel member filled in the element hole to seal the pressure detection element, wherein:
the element locating portion of the casing has an opening portion connected with the element hole:
the gel member filled in the element hole is exposed from the opening portion of the element locating portion in the casing and is provided such that the pressure of the pressure medium is applied to the pressure detection element through the gel member; and
the gel member protrudes from a surface of a circumference portion of the opening portion in the casing.

2. The pressure sensor according to claim 1, further comprising
a protrusion portion protruding from the surface of the circumference portion of the opening portion to surround the gel member.

3. The pressure sensor according to claim 1, wherein the gel member protrudes from the surface of the circumference portion in a cylindrical shape.

4. The pressure sensor according to claim 1, wherein the gel member protrudes from the surface of the circumference portion in a round shape.

5. The pressure sensor according to claim 1, wherein the surface of the circumference portion extends approximately vertically.

6. The pressure sensor according to claim 1, wherein the gel member is made of a gel material.

7. The pressure sensor according to claim 1, wherein the circumference portion has grooves recessed from the surface of the circumference portion.

8. The pressure sensor according to claim 1, further comprising a plurality of protrusions protruding from the surface of the circumference portion.

9. The pressure sensor according to claim 1, wherein:
the pressure detecting element includes a sensor chip for detecting the pressure of the pressure medium, and a pedestal for supporting the sensor chip; and
the element hole includes a through hole penetrating through the pedestal.

10. The pressure sensor according to claim 9, wherein the element locating portion has an element locating chamber in which the sensor chip and the pedestal are accommodated, the pressure sensor further comprising
a second gel member filled in the element locating chamber to seal the sensor chip and the pedestal.

11. The pressure sensor according to claim 9, wherein the gel member is in continuous, uninterrupted contact with the element bole and completely fills the element hole from the sensor chip to the surface of the circumference portion.

12. The pressure sensor according to claim 1, wherein the gel member protrudes to a side opposite to the pressure detection element.

13. The pressure sensor according to claim 1, wherein the gel member is in continuous, uninterrupted contact with the element hole and completely tills the element hole.

14. A pressure sensor for detecting a pressure of a pressure medium, comprising:
a casing having an element locating portion;
a pressure detection element located in the element locating portion of the casing; and a gel member filled in the element locating portion to seal the pressure detection element, wherein:
the gel member is exposed from an opening portion of the element locating portion in the casing and is provided such that the pressure of the pressure medium is applied to the pressure detection element through the gel member;
the gel member protrudes from a surface of a circumference portion of the opening portion in the casing;
further comprising water-staying prevention means for preventing water from staying on the surface of the circumference portion around the opening portion in the casing.

* * * * *